United States Patent
Bean et al.

(10) Patent No.: US 9,652,951 B2
(45) Date of Patent: May 16, 2017

(54) BARRIER ASSEMBLY

(71) Applicants: Strang Patrick Holdings Pty Ltd, North Sydney, New South Wales (AU); Modalinta Pte Ltd, Astoria Park (SG)

(72) Inventors: David Robin Bean, Surry Hills (AU); Matthew James Hollamby, North Sydney (AU)

(73) Assignee: SOTAERIA PTY LIMITED, Surry Hills NSW (AU)

( * ) Notice: Subject to any disclaimer, the term of this patent is extended or adjusted under 35 U.S.C. 154(b) by 0 days.

(21) Appl. No.: 14/772,998

(22) PCT Filed: Mar. 5, 2014

(86) PCT No.: PCT/AU2014/000203
§ 371 (c)(1),
(2) Date: Sep. 4, 2015

(87) PCT Pub. No.: WO2014/134667
PCT Pub. Date: Sep. 12, 2014

(65) Prior Publication Data
US 2016/0012694 A1  Jan. 14, 2016

(30) Foreign Application Priority Data
Mar. 6, 2013 (AU) .................... 2013900762

(51) Int. Cl.
G08B 13/12 (2006.01)
G08B 13/183 (2006.01)
F16P 1/02 (2006.01)

(52) U.S. Cl.
CPC .............. *G08B 13/124* (2013.01); *F16P 1/02* (2013.01); *G08B 13/122* (2013.01); *G08B 13/183* (2013.01)

(58) Field of Classification Search
CPC .... G08B 13/122; G08B 13/124; G08B 13/14; G08B 13/1409; G08B 13/1427; G08B 13/1436; G08B 13/1445; G08B 13/1472; G08B 13/1481; G08B 13/183; E01F 13/00; E01F 13/02; E01F 13/022; E01F 13/024; E01F 13/026; E01F 13/04; E01F 13/046; E01F 13/048; E01F 15/0438; E01H 17/24
See application file for complete search history.

(56) References Cited

U.S. PATENT DOCUMENTS

| | | | |
|---|---|---|---|
| 4,954,813 A | 9/1990 | August, Sr. et al. | |
| 2003/0183814 A1* | 10/2003 | Marsh | E01F 13/12 256/1 |
| 2007/0235068 A1* | 10/2007 | Green | E01F 13/022 135/114 |

(Continued)

FOREIGN PATENT DOCUMENTS

| | | |
|---|---|---|
| EP | 0352071 A1 | 1/1990 |
| WO | 2012064951 A2 | 5/2012 |

*Primary Examiner* — Van Trieu
(74) *Attorney, Agent, or Firm* — Nexsen Pruet, PLLC; E. Eric Mills

(57) ABSTRACT

There is disclosed herein a barrier assembly (1) adapted to inhibit access to an area. The assembly including at least two markers (2) operatively associated with each other to define an area where access is to be inhibited. Means to connect said markers and monitoring means adapted in use to determine if access to said area has been breached.

15 Claims, 8 Drawing Sheets

(56) References Cited

U.S. PATENT DOCUMENTS

| | | | |
|---|---|---|---|
| 2008/0038055 A1* | 2/2008 | Jankovsky | E01F 13/048 404/6 |
| 2009/0008042 A1* | 1/2009 | Snyder | E01F 13/028 160/264 |
| 2010/0090184 A1* | 4/2010 | Manning | E01F 13/028 256/1 |
| 2010/0301294 A1* | 12/2010 | Pasqualini | E01F 13/026 256/1 |
| 2014/0028474 A1* | 1/2014 | Poeth | G08B 5/006 340/908.1 |

* cited by examiner

BARRIER ASSEMBLY

CROSS REFERENCE TO RELATED APPLICATIONS

The presently disclosed subject matter is related and claims priority to International PCT Application No. PCT/AU2014/000203, entitled "A Barrier Assembly," filed on Mar. 5, 2014 which claims priority to Australian Provisional Application No. 2013900762, filed on Mar. 6, 2013; the entire disclosures of which are incorporated herein by reference.

FIELD

The present invention relates to a barrier assembly and in particular to an assembly of parts and a method of use of those parts to inhibit and monitor access to an object or area.

BACKGROUND

Throughout the world objects and areas need to be protected from unwanted access by the general public, workers, animals, machinery or the like. The reason to prevent or limit access could be due to security reasons, dangerous goods, child hazards, occupational health and safety reasons, or the like. One such area where issues of access are regularly considered is in the transportation industry. The transportation industry involves trucks, vans, trains, planes, ships and the like moving about places with high traffic and regularly carrying goods with varying degrees of secrecy, danger or hazard.

To limit the dangers to workers, the general public, machinery and the like shipping terminals for example are adopting isolation protocols known as a "Restricted Zone". These include isolating work areas around mobile plant, walkways, truck driver isolation/waiting areas during routine operations and maintenance or during emergency times such as an accident/spill.

Unauthorized access to a restricted zone, especially temporary ones, is common and difficult to manage. Many uses of restricted zones involve situations where the responsible operators are unable to see all the access points about the zone which makes the zone difficult to manage. For example, it is possible for an unauthorised person to enter the zone without detection. An undetected breach of a restricted zone could be fatal to that person, cause serious machinery damage or compromise the purpose for which the barrier was established.

There are few if any means for ensuring that safe zones are correctly deployed and operated, especially when they may have been erected in a low traffic area.

Even in circumstances where a barrier is erected about an area, the fact that the barrier is essentially static allows intruders to willfully breech the barrier without an alarm being raised with personnel either legitimately in the area or overseeing the area. This is particularly important in the transportation industry where work areas can be spread widely over larger sites and are thus not susceptible to constant surveillance guards, gatekeepers, flagmen or the like.

Currently, there are few if any means by which an operator can assure themselves and others that a restricted zone is actually in place and operational without having staff physically present about the zone.

Accordingly, there is a need to provide a barrier assembly that indicates to a supervisor, operator or the like, a warning of a breach of a secure zone.

There is also a need to provide a barrier assembly which advises supervisor, operator or the like of the status of a restricted zone and of any breaches, quickly, easily and affordably.

OBJECT OF INVENTION

It is an object of the present invention to substantially overcome or at least ameliorate one or more of the disadvantages of the prior art, or to at least provide a useful alternative.

SUMMARY OF INVENTION

There is disclosed herein a barrier assembly adapted to inhibit access to an area, the assembly including:
  at least two markers operatively associated with each other to define an area where access is to be inhibited;
  means to connect said markers; and
  monitoring means adapted in use to determine if access to said area has been breached.
Preferably, each said marker includes:
  a base to be placed on a surface and adapted to locate said marker at a limit of said area; means to engage said connection means; and
  warning means operatively associated with said monitoring means to indicate when said area has been breached.
Preferably, said connection means includes sensors attached to said engagement means and adapted in use to generate a beam between a pair of markers.
Preferably, said beam is an infrared beam.
Preferably, said connection means includes at least one length of material adapted in use to extend between a pair of markers.
Preferably, at least one end of said length of material includes a connector adapted to connect said connection means to said engagement means and/or a surface.
Preferably, said material is solid.
Preferably, said material is flexible.
Preferably, said base includes a shaft about which said length of material is wound when not in use.
Preferably, said shaft including a spindle, said material being retractable about said spindle when not in use.
Preferably, said warning means includes one or more of a visual alarm, an audible alarm, a remote alarm and/or a physical alarm.
Preferably, said assembly is adapted to be locatable when not in use in a backpack or bandolier capable of being carried by a person.
Preferably, said base includes a magnet to permit said marker to be placed on a metallic surface.
Preferably, said base includes a horn to sound an alarm in use.
Preferably, said base includes suction means to permit said marker to be secured to a surface.
Preferably, said length of material includes a telescopically extendable arm.

BRIEF DESCRIPTION OF DRAWINGS

A preferred embodiment of the invention will now be described, by way of example only, with reference to the accompanying drawings, wherein.

DESCRIPTION OF EMBODIMENTS

Figure 1:
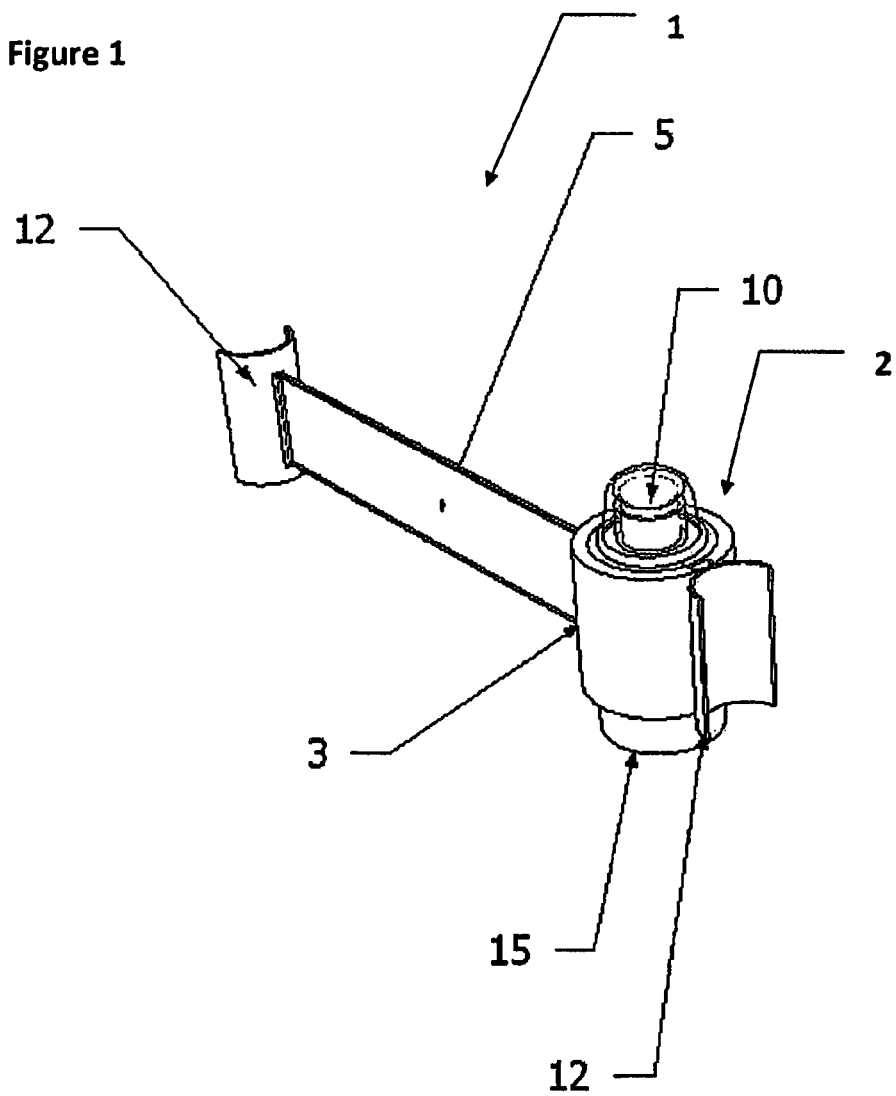
FIG. 1 shows an embodiment of the barrier assembly of the present invention.
Figure 2:
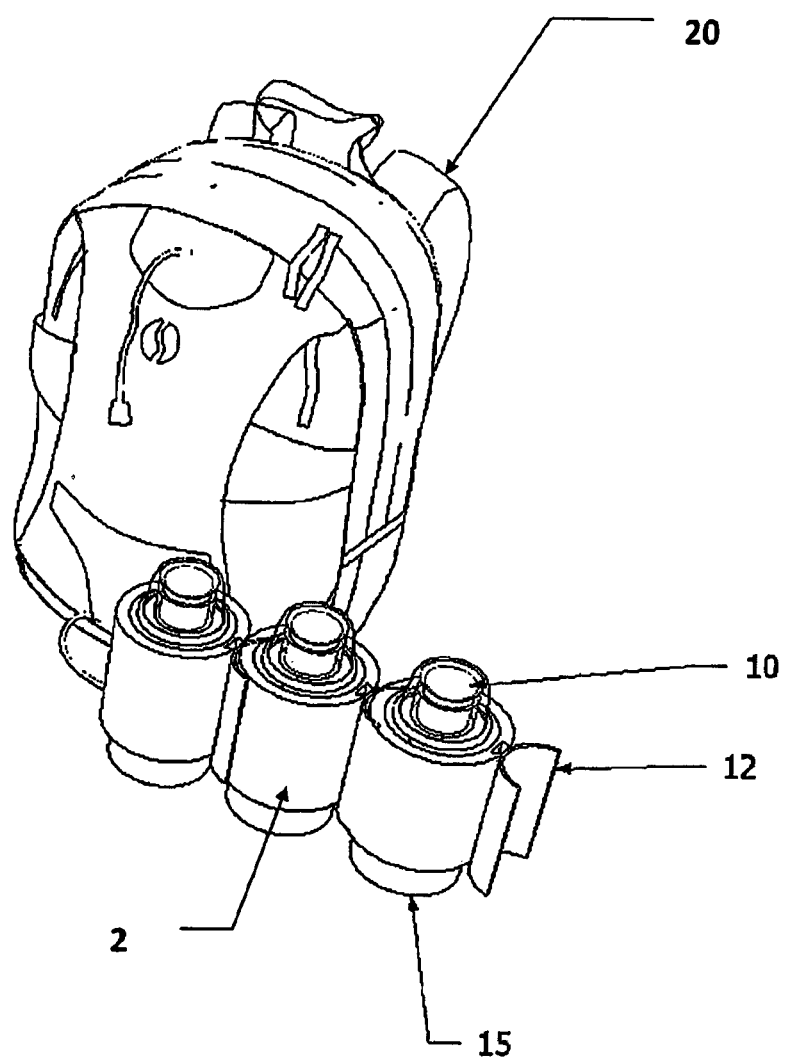
FIG. 2 shows a barrier assembly of the present invention attached to a backpack.

There is disclosed herein a barrier assembly 1 adapted to inhibit access to an area or object 100. The assembly 1 includes at least two markers 2 operatively associated with each other to define an area where access is to be inhibited. Each marker 2 includes a base 3 to be placed on a surface (such as the ground, an object 100, a container, a ship, a locomotive, a machine, a wall or the like) to locate the marker 2 at a limit of the area to be secured. The marker 2 can include various means to connect each marker 2 together.

Figure 3:
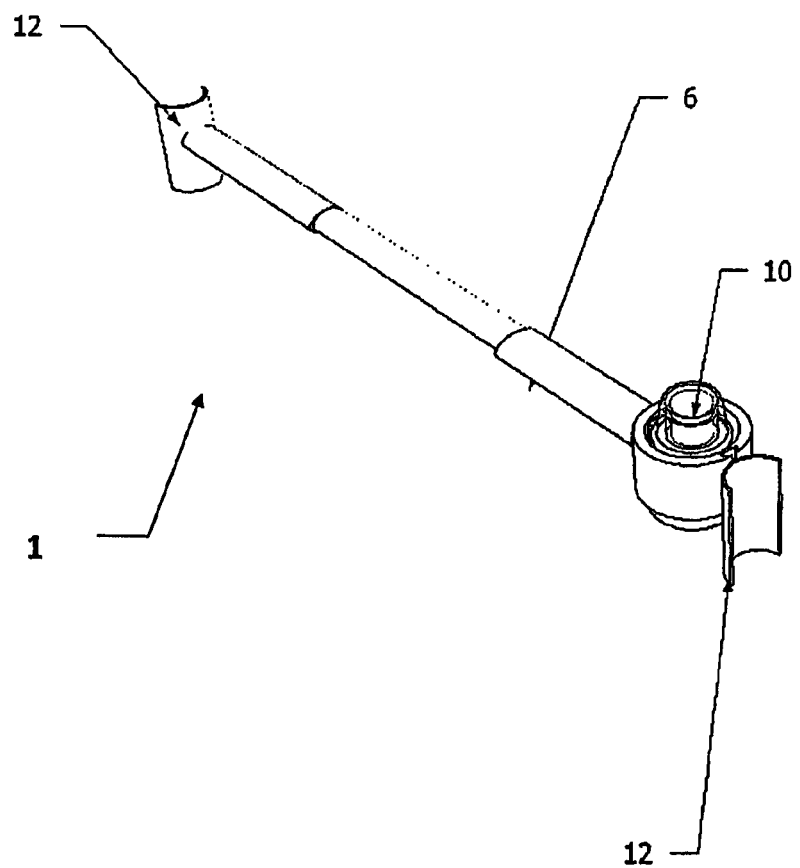
FIG. 3 shows another embodiment of barrier assembly of the present invention.

In one form, connection means includes a sensor or the like which generates a beam or signal (such as an infrared beam or the like) between a pair of markers 2. In another form, the connection means (as best seen in FIG. 1) includes a length of flexible material 5 adapted to be extended between markers 2 and/or a surface. The flexible material 5 may be manufactured of any material. In another form (as best seen in FIG. 3) the connection means includes an arm 6 or the like to extend between markers 2 and/or a surface. The arm 6 can take the form of a metal or plastic tube or the like. The arm 6 can also include a plurality of moveable portions and/or be telescopically engageable. The arm 6 can be manufactured of any material. In yet another embodiment, the assembly 1 is added to a pre-existing apparatus such as a gate or barrier. Monitoring means is operatively associated with the markers 2 and adapted in use to determine if access to the area has been breached by a person or object crossing between the markers 2. The monitoring means can include warning means operatively associated with the monitoring means to highlight when the area has been breached.

In a preferred form, the warning means includes one or more of a visual alarm (light 10), an audible alarm (horn 15), a remote alarm and/or physical alarm. In the Figures, one such warning means is a Strobe or light 10. These alarms may also include the activation of a video camera or other recording/transmitting device. The alarm means may include a visual, audible or physical communication from a person or machine that is alerted by the device. The assembly 1 can further include a series of attachment means 12 connected to the base 3 for example or connection means 5, 6 as shown in FIGS. 1 and 3 to assist with connecting the assembly 1 between various surfaces and markers 2 about the area. These could include Velcro™, magnets, suction cups, ties, chains, fasteners, ropes, tape, adhesive or other attachment means.

In a preferred form, the assembly 1 would be adapted to be located within a backpack 20, bandolier or the like. This will allow a user to set up a barrier about an area quickly and easily.

Accordingly, the assembly 1 can provide an indication which areas are being isolated at any given time and provide a visible and physical warning that people, animals or machinery are about to, or already have, entered a restricted zone.

The physical, audio and visual alarms provide the unauthorized person, those in the area and in particular the supervisor or operator a warning that a breach has occurred. This warning is effective in all conditions with a system for warning the supervisor or operator even if he/she is not present in the restricted zone at the time by way of Wi-Fi, Bluetooth, radio waves or the like. The assembly 1 can operate in extreme weather and rapidly changing environments. The assembly 1 also includes tamper evident alarms to indicate if the integrity of the assembly 1 has been compromised. The assembly 1 is kept as simple as possible to ensure that the assembly 1 is able to be deployed quickly without creating further hazards or labour requirements through carrying excessive equipment. All items of the barrier assembly 1 fit into a backpack 20, bandolier or the like and are able to be set up quickly and easily without exposing staff to new hazards.

In one form, the assembly 1 provides automatic incident recording so that managers and others can receive automatic notifications of any restricted zone breaches. A means of recording a supervisor's report and adding it to the breach notification (e.g. voice message, txt message) could be utilized.

With the present invention maintenance costs and deployment costs would be minimized. The supervisor or operator is in complete control of the perimeter system and can be fully accountable for its operation. The assembly 1 can include a system to record when a supervisor or operator is not present. It provides a positive means of reporting that it is active and warning of any equipment failure which also provides a means of warning a supervisor or operator that they have left a marker 2 behind (or that a marker 2 has been removed). This can be done either by the use of audible 10/visual 15 warnings to those nearby that the assembly 1 or by use of remote communications means such as the internet whereby the warning is relayed to those needing to know. The assemblies 1 can also include radio equipment sufficient to allow the creation of a local "web", Wi-Fi hotspot, network or the like. Removal of a marker 2 from the network either through failure, being removed or being left behind when the rest of the network is removed will result in a warning to the operator as well as triggering of the alarms on the assembly 1 that a marker 2 has been left behind.

In the embodiment of FIG. 1, the assembly 1 further includes a lightweight "inertia reel" type barricade tape 5 (or an optional extendable bar 6 in FIG. 3) which are placed by the supervisor at a perimeter of a safety exclusion zone. A set of markers 2 fit into a small backpack 20 and weigh less than 5 kg. The markers 2 are enabled with electronics that provide, breach detection, tamper detection, warning light (strobe 10), audible alarm (horn 15), remote indication, phone warning, web based reporting or the like. Activation/Deactivation can be started or stopped by a "smart card" or similar device and by only an authorized person.

Figure 4:
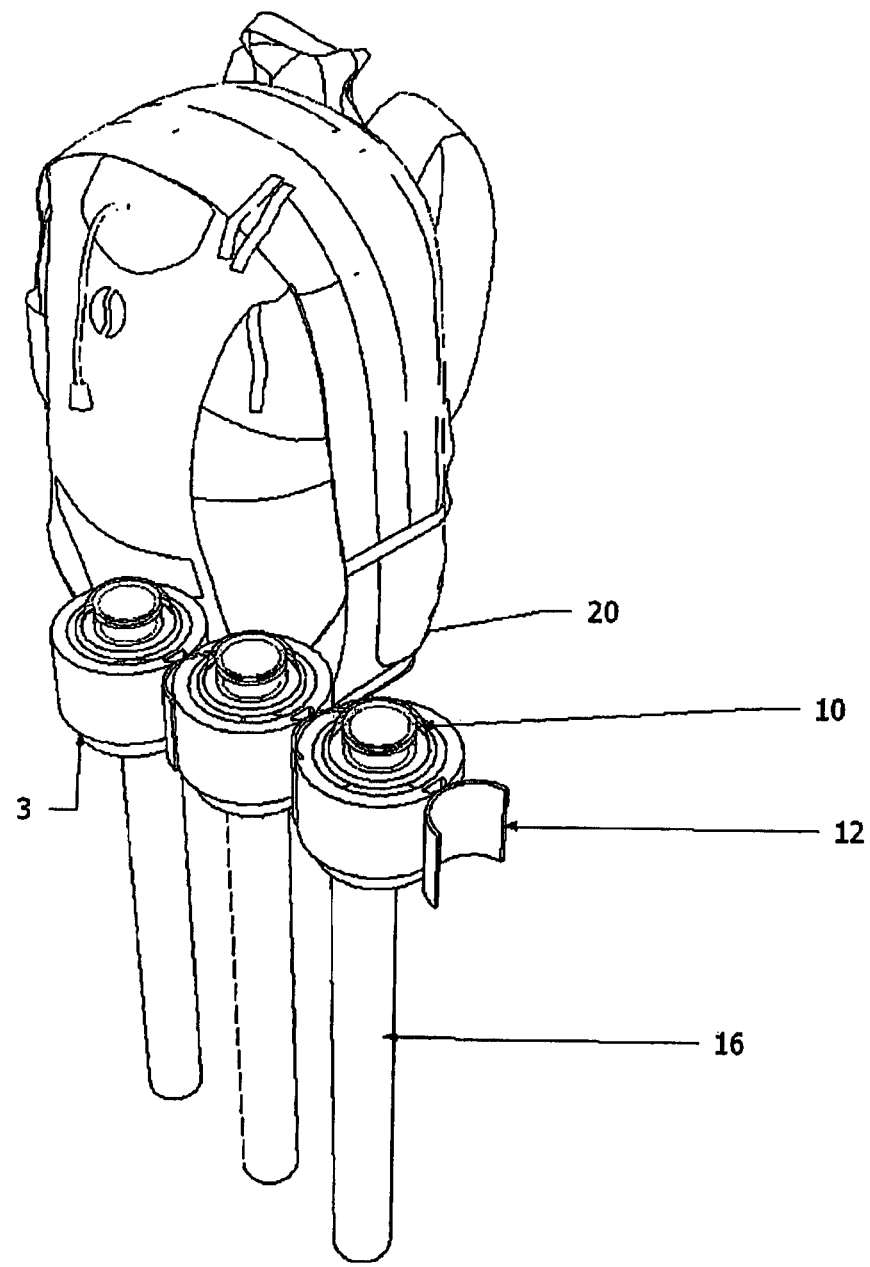
FIG. 4 shows a barrier assembly of an alternate embodiment of the present invention attached to a backpack.
Figure 5:
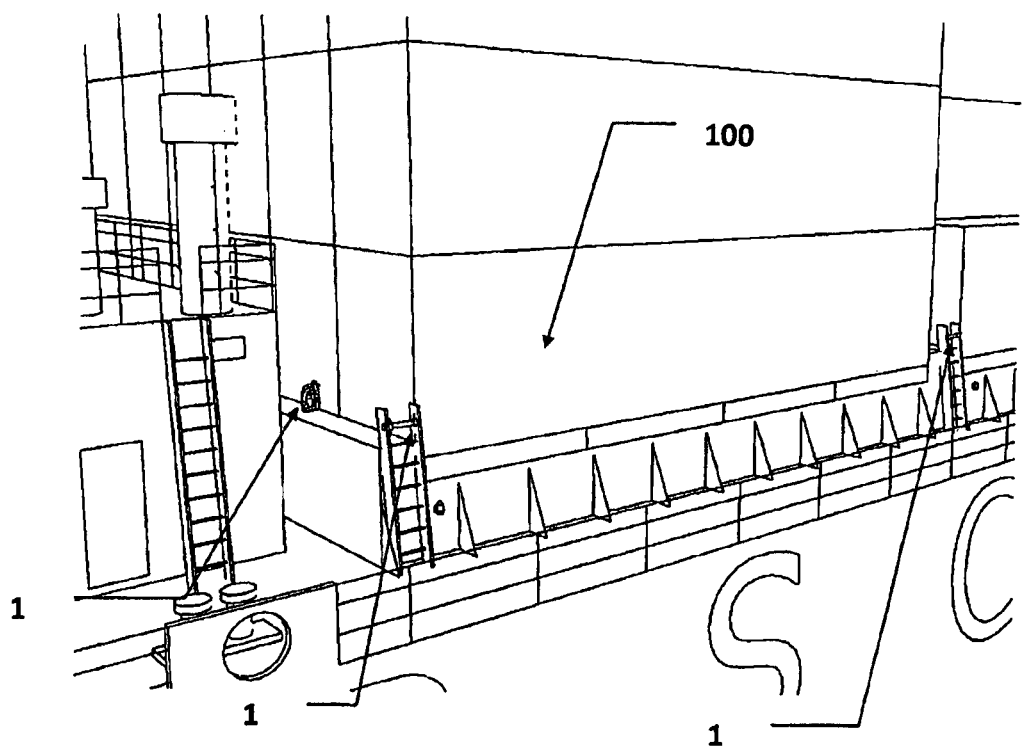
FIG. 5 shows a barrier assembly of the present invention in use on a ship.
Figure 6:
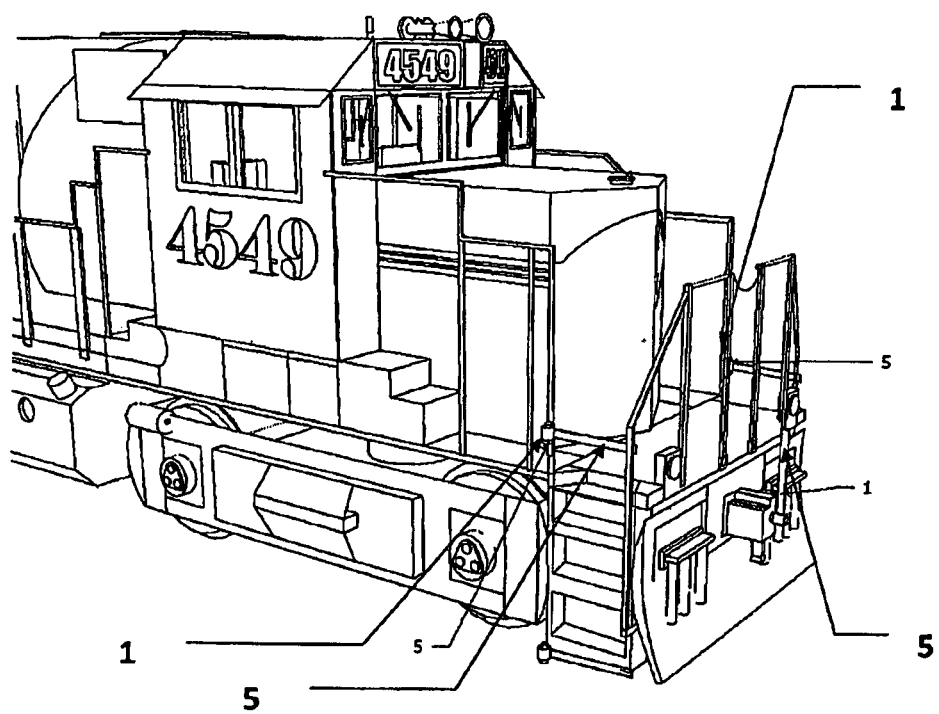
FIG. 6 shows a barrier assembly of the present invention in use on a locomotive.
Figure 7A:
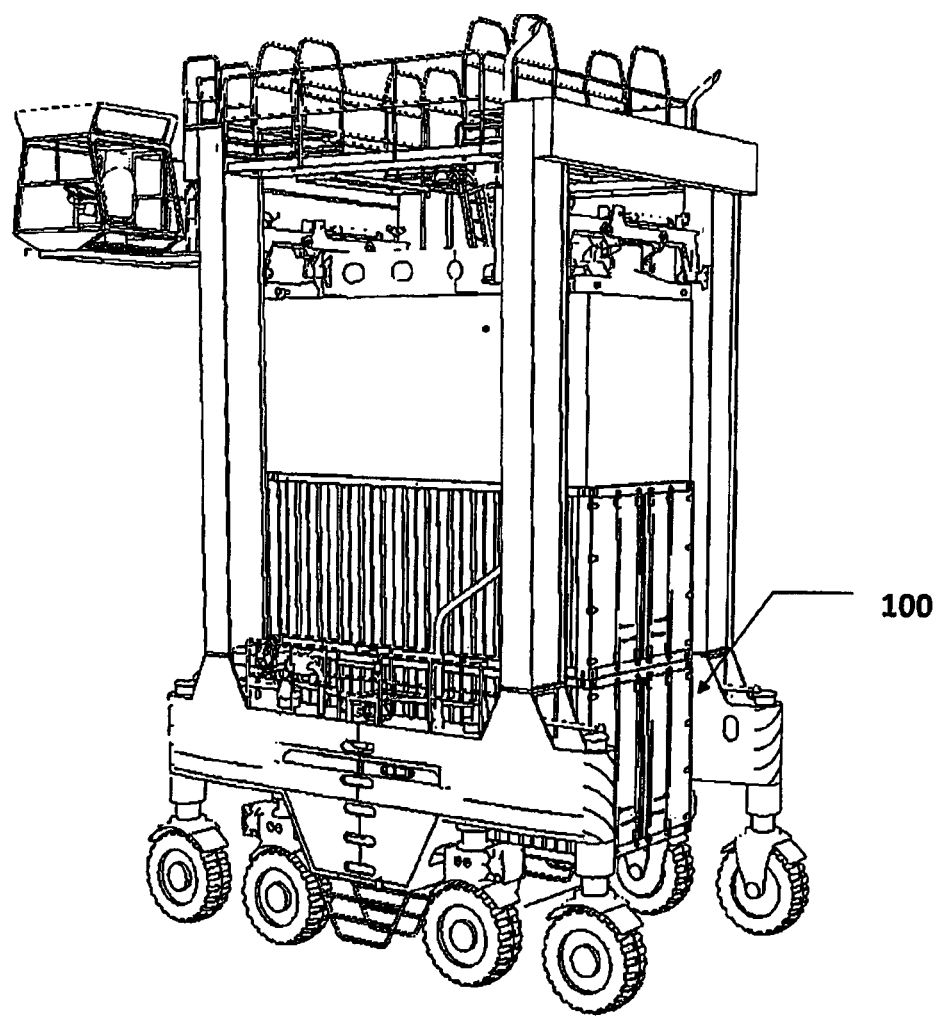
FIGS. 7a and 7b show a barrier assembly of the present invention in use in a container terminal.
Figure 7B:
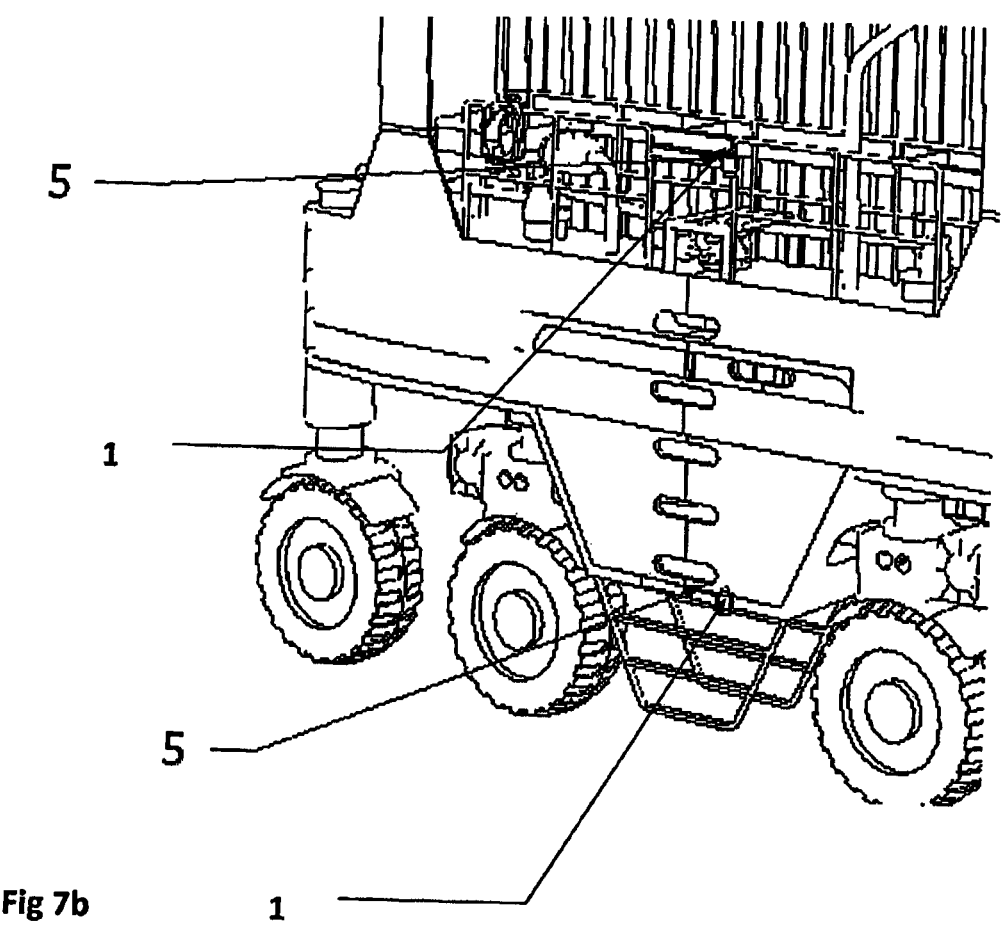

In operation, the set up would take less than 15 seconds for each marker 2. The user would attach each marker 2 to surfaces at top (or bottom) of a ladder or machine for example with Velcro™, magnets, suction cups, ties, chains, fasteners, ropes, tape, adhesive or other attachment means. The user would then swipe the activating card to arm the assembly 1. The assembly 1 would then "pulse" a transmission to confirm it is armed. As shown in FIG. 4, the assembly 1 could include elongate legs 16 to assist with use and securing.

The assembly 1 would continue to pulse to let the supervisor's sensor know that all markers 2 are functioning. If proximity sensors or barricade sensors are tripped, the alarm and strobe activate, the supervisor's sensor is activated plus in the case of a container terminal, the crane driver sensor (reduces delay telling crane to stop, allows for supervisor not to be present). The assembly 1 would continue to alarm until reset by the supervisor or another activating card. This could be done remotely if desired. The assembly 1 could transmit a breach to a web based system for reporting purposes.

If the assembly 1 stops transmitting the supervisor or other machine operator would get a warning and a report is generated. There would also be a low battery warning provided as each marker 2 would include a battery, solar panel, independent power supply, wind power, machine power connection, mains connection and/or be rechargeable. The battery (not shown) would be located in the base 3.

The markers 2 can have a charger (not shown) in which they are stored. The charger can monitor battery life and a warning if a marker 2 goes out of range (stolen, forgotten) and a means of making the marker 2 flash to facilitate collection.

The backpack 20 can be tailored to carry all on-board items for a supervisor such as: torch, radio, tablet, for example.

Accordingly, the present invention in a preferred embodiment provides minimal impact on operators to encourage compliance. The assembly 1 only isolates areas that actually require a restricted zone and is easy to carry, set up, use and remove.

The present invention also allows a form of tracking to allow progressive opening up of a sub-zone within a restricted zone. This could include a means of monitoring people located within the safe zone in "virtual zones" or a means of deploying extra markers 2 within the zone to demarcate the edge of the safe working area.

In alternate forms, the assembly 1 can include a long range laser (or other) beam and sensor that allows the sensor to monitor long perimeters between markers 2 such as those along a train. The assembly 1 may also include a "doorbell" or the like by which means a person can make their presence at a barricade known to the area supervisor or the like without tripping the alarm. The assembly 1 can be provided with a radio allowing a person at a barricade to speak with the area supervisor (or others) without entering the safety exclusion zone. A means can be provided whereby the supervisor (or delegate) can disarm the assembly 1 remotely. This allows entry to be permitted without the physical presence at the barricade of the supervisor. The assembly 1 may also be provided with a video link to record activity near the barricade or to provide a person or system monitoring the barricade with a means of seeing who is at the barricade. A video link can also be used to record breaches of the barricade, either recording the activity and the perpetrator in response to the activating of the barricade or permanently recording all activity.

In other forms, the assembly 1 can include a GPS transponder or other location detection equipment to provide accurate location information about each marker 2 or backpack 20.

The assembly 1 can also be provided with a housing or other means whereby a marker 2 can be deployed as a permanent fixture.

The assembly 1 can be provided with a means such as a counter by which the number of people entering and exiting an area may be monitored and recorded. The assembly 1 may be provided with means by which the assembly 1 can actively discourage breaching of the barrier. This could include means such as bright lights, automatic barrier erection (e.g. fly up screens, closing of a gate) or physical means of dissuasion such as projectiles, dye, bullets, lasers or the like.

The assembly 1 may be provided with means by which "repeater" radios or other communication devices may be used to allow the assembly 1 to be effective in areas with line of sight or similarly impaired communications only (such as mines)

The assembly 1 may also be equipped with other physical barriers such as gates, lifting booms, turnstiles and the like to allow the remote monitoring technology to be applied to many common forms of existing barricade.

Although the invention has been described with reference to specific examples, it will be appreciated by those skilled in the art that the invention may be embodied in many other forms.

The invention claimed is:

1. A barrier assembly adapted to inhibit access to an area, the assembly comprising:
   at least two markers operatively associated with each other to define an area where access is to be inhibited;
   means to connect said markers;
   means to engage said connection means, said connection means comprising sensors attached to said engagement means and adapted in use to generate a linear beam between a pair of markers;
   monitoring means adapted in use to determine if access to said area has been breached;
   warning means operatively associated with said monitoring means to indicate when said area has been breached; and
   authorization means to be used by a person seeking access to said area to alert an authority to their presence, said authority using said authorization means to allow said person seeking access to access said area without said warning means indicating a breach of said area.

2. The barrier assembly according to claim 1, wherein each said marker comprises:
   a base to be placed on a surface and adapted to locate said marker at a limit of said area.

3. The barrier assembly according to claim 2, wherein said base includes a magnet to permit said marker to be placed on a metallic surface.

4. The barrier assembly according to claim 2, wherein said base includes a horn to sound an alarm in use.

5. The barrier assembly according to claim 2, wherein said base includes suction means to permit said marker to be secured to a surface.

6. The barrier assembly according to claim 1, wherein said beam is an infrared beam.

7. The barrier assembly according to claim 1, wherein said connection means includes at least one length of material adapted in use to extend between a pair of markers or between a marker and a surface.

8. The barrier assembly according to claim 7, wherein at least one end of said length of material includes a connector adapted to connect said connection means to said engagement means and/or said surface.

9. The barrier assembly according to claim 7, wherein said material is solid.

10. The barrier assembly according to claim 7, wherein said material is flexible.

11. The barrier assembly according to claim 7, wherein said base includes a shaft about which said length of material is wound when not in use.

12. The barrier assembly according to claim 11, wherein said shaft includes a spindle, said material being retractable about said spindle when not in use.

13. The barrier assembly according to claim 7, wherein said length of material includes a telescopically extendable arm.

14. The barrier assembly according to claim 1, wherein said warning means includes one or more of a visual alarm, an audible alarm, a remote alarm and/or a physical alarm.

15. The barrier assembly according to claim 1, wherein said assembly is adapted to be locatable when not in use in a backpack, bandolier, or similar bag capable of being carried by a person.

\* \* \* \* \*